Patented Sept. 21, 1954

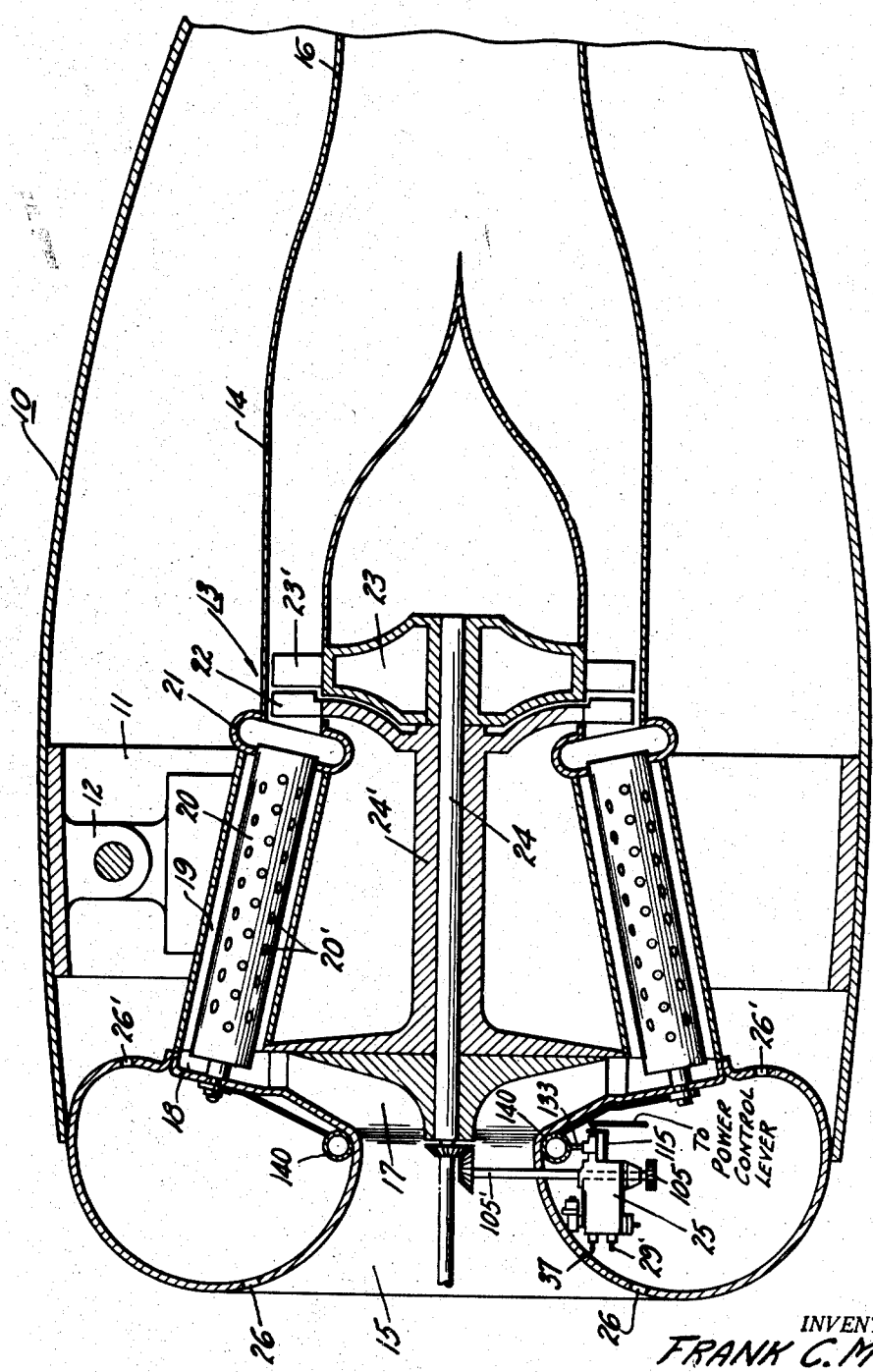

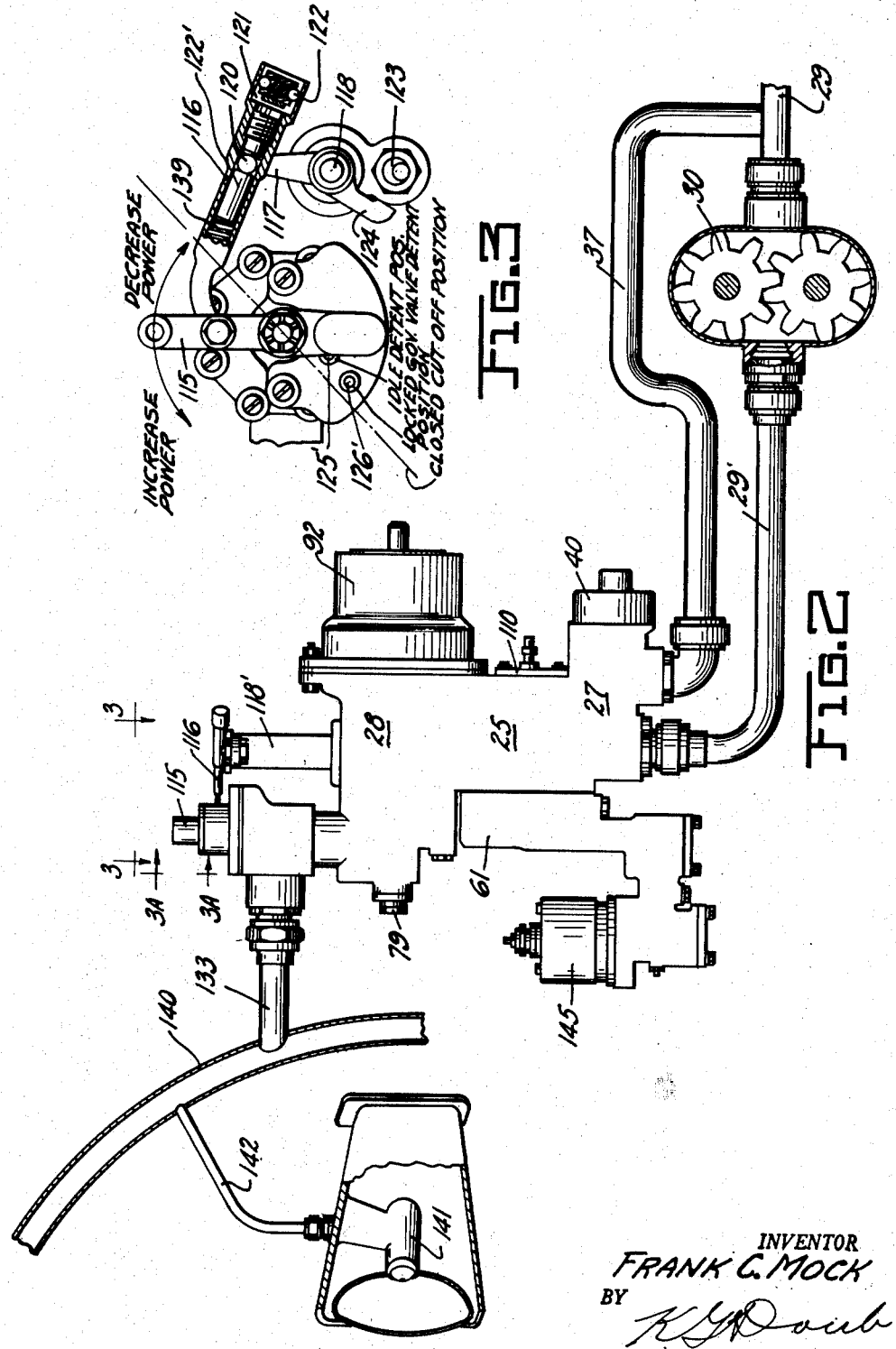

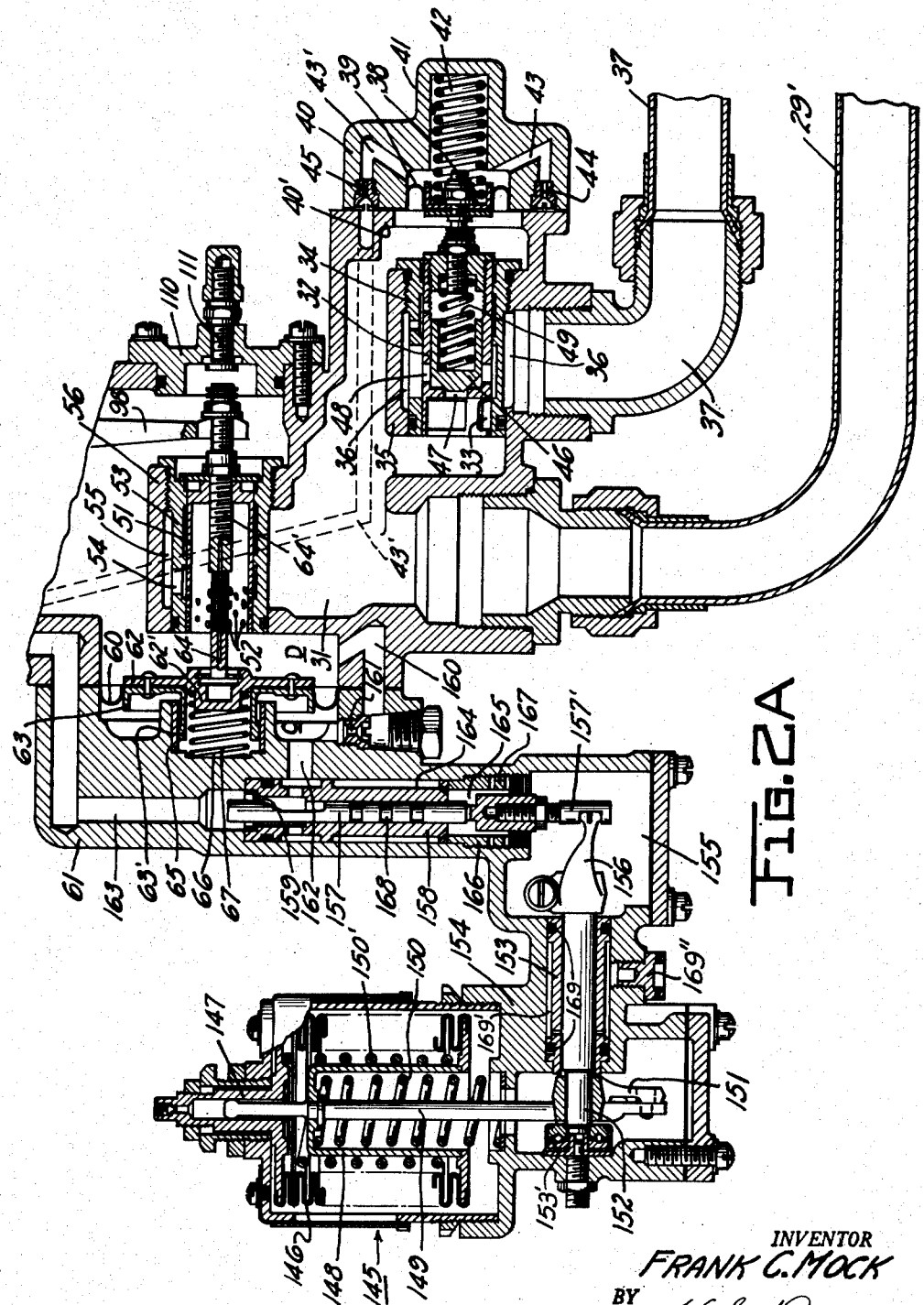

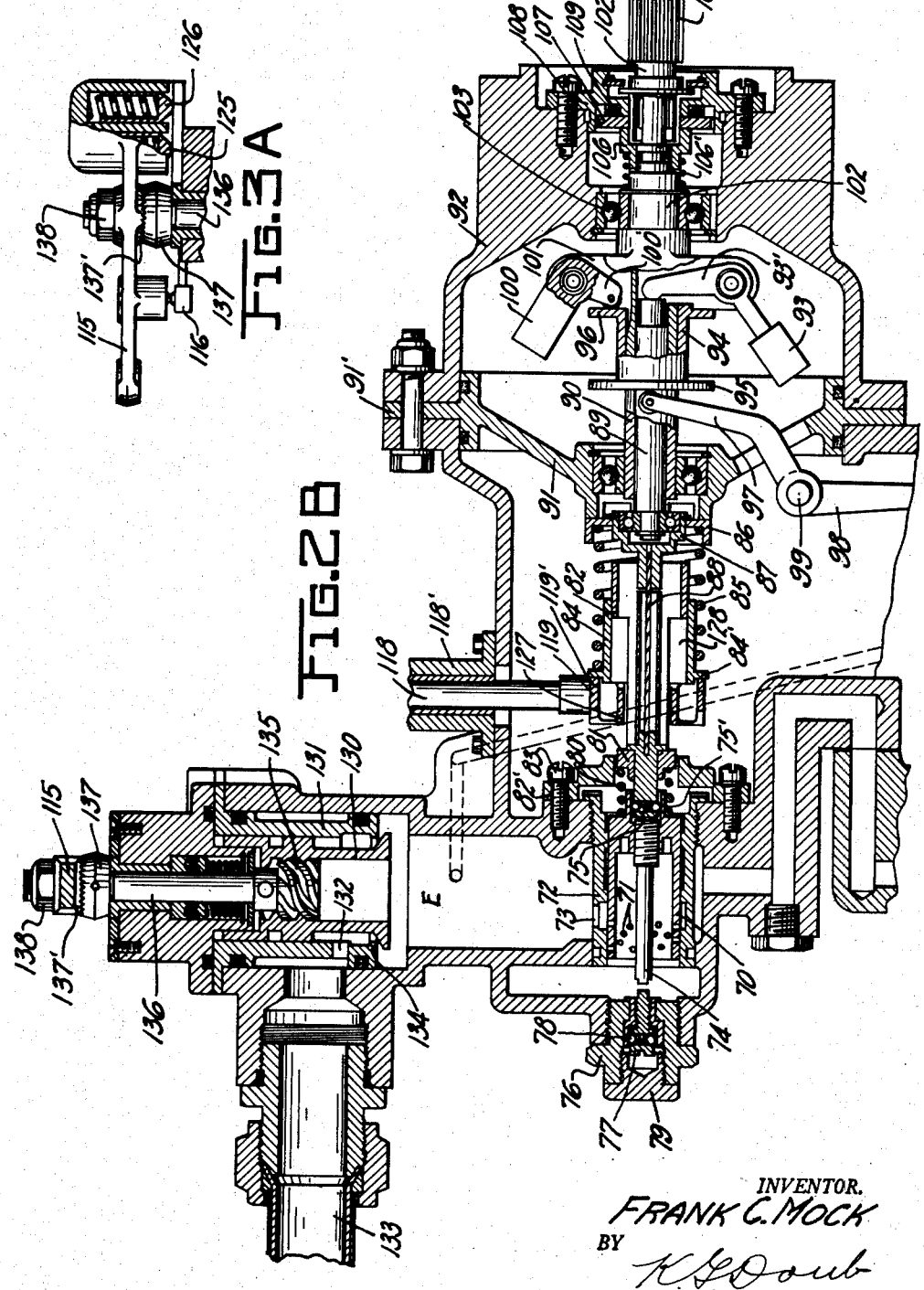

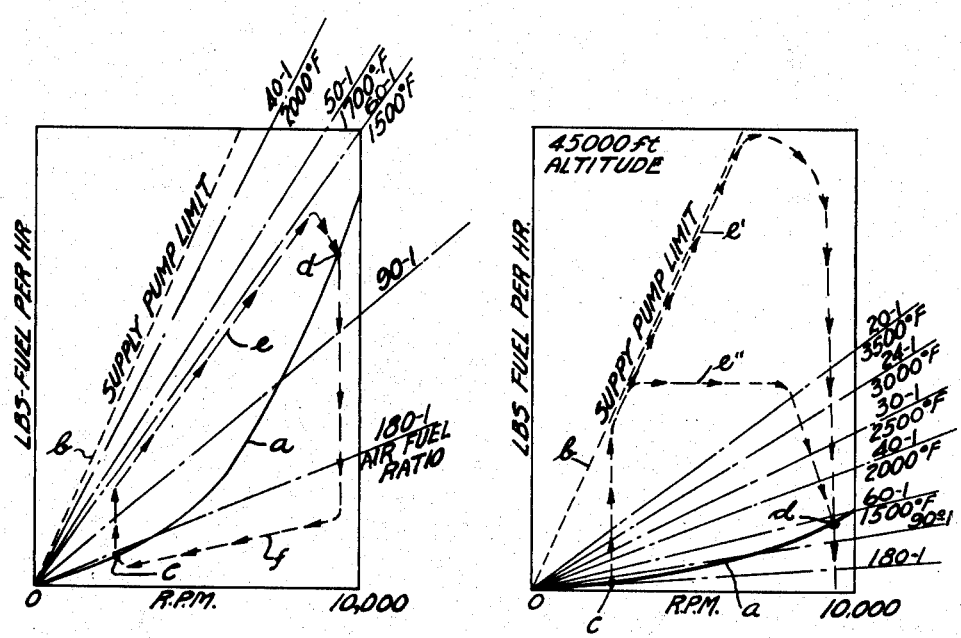
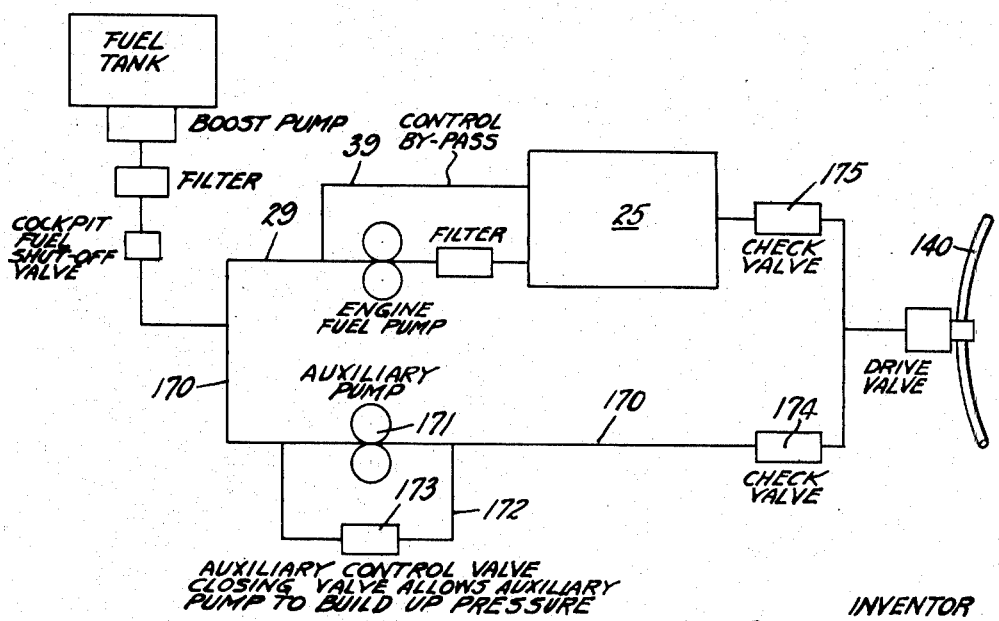

2,689,606

UNITED STATES PATENT OFFICE 2,689,606

FUEL FEEDING SYSTEM FOR GAS TURBINE ENGINES

Frank C. Mock, South Bend, Ind., assignor to Bendix Aviation Corporation, South Bend, Ind., a corporation of Delaware Application December 13, 1946, Serial No. 716,154

15 Claims. (Cl. 158—36.4)

This application contains subject matter common to the prior copending applications of Frank C. Mock, Serial No. 557,812, filed October 9, 1944, now Patent No. 2,581,275, and Serial No. 596,620, filed May 30, 1945, now Patent No. 2,581,276.

The invention disclosed herein relates to a fuel feed and power control device for gas turbines, jet propulsion machines or engines and like power plants utilizing the force or energy produced by the combustion and expansion of precompressed air; it is particularly adapted for jet propulsion power plants for aircraft wherein the air is compressed into a chamber constituting part of a generator, at which point it is heated by the combustion of fuel, and the air and products of combustion passed through a turbine for driving a compressor and then discharged through a reaction jet to propel the aircraft; and power plants for aircraft wherein a gas turbine drives the propeller of the aircraft and may in addition drive a compressor for supplying air to a combustion chamber or generator, and wherein also the exhaust from the turbine may be discharged through a reaction jet to obtain a propulsion effort augmenting that of the propeller.

In a power plant of the type utilizing a centrifugal or axial flow compressor connected to and rotated in synchronism with a gas turbine driven by the energy of expanded gases produced in a combustion chamber or burner in which the air is compressed, to have the maximum available power for acceleration, it is desirable to supply as much fuel as the burner will consume at any given condition without producing dangerously high temperatures in the burner system. For deceleration, a minimum constant fuel-air ratio should be maintained to avoid die-out or burner failure.

An extremely simple power control arrangement for gas turbines and jet propulsion engines may be provided by connecting a power control lever or quadrant to a metering needle or valve adapted to vary the area of a metering orifice or variable feed restriction to which fuel is supplied under pressure, as by an engine driven fuel pump. With this arrangement, the pilot advances or retracts the control lever or quadrant to obtain a selected speed, whereupon the engine speeds up or slows down to a speed corresponding to the rate of fuel feed set by the lever or quadrant. Another relatively simple arrangement may be had by operatively connecting an engine driven governor with the metering needle in a manner such that the governor functions to establish equilibrium at the rate of fuel feed selected, or the point of acceleration or deceleration set by the pilot's control lever. While such systems have the advantage of simplicity, there is danger of producing such a hot flame during acceleration as will tend to burn out the burner tubes and damage the turbine blades, while during deceleration there is the liability of reducing the fuel-to-air ratio to a point where the burner will die out or fail. When the area of the metering orifice is suddenly increased to obtain the desired speed, the engine lags and the fuel supplied to the burners is greatly in excess of that required for the quantity of air delivered to the burners in proportion to engine speed, and as a consequence, an extremely hot flame is produced which not only tends to damage and shorten the life of the engine or power plant, but also constitutes a waste of fuel. Furthermore, as engine speed and hence compressor speed and the delivery of air to the burners increases, the burner flame must be properly regulated, else so-called burner blow-out may occur. On the other hand, when the area of the metering orifice is suddenly reduced and the rate of fuel fed correspondingly reduced, the engine temporarily maintains its speed due to momentum and the fuel/air ratio becomes so lean as to prohibit flame propagation, resulting in burner failure.

It is also desirable to provide some means for compensating for changes in entering air density irrespective of what type of power control system is adopted, since less fuel is required to drive a turbine and compressor at a given speed upon a decrease in density, and if the same rate of fuel feed is maintained, the proportion of fuel to air will become further unbalanced, aggravating the tendency to overheat the burner system.

An object of the present invention is to provide a fuel feed and power control system for power plants of the type specified wherein the rate of fuel feed may be controlled simply by a lever or quadrant operatively connected to a metering needle or valve for varying the area of a fuel metering orifice without danger of overheating the burner system and/or causing burner or flame blow-out during acceleration, or burner failure during deceleration.

Another object is to provide an improved fuel feed and power control device for power plants of the type specified wherein the rate of fuel feed is maintained within predetermined upper and/or lower limits as a function of engine speed and the pressure and/or temperature of the air flowing to the engine during a transitional speed change following a change in the setting of the throttle or power control lever.

A further object is to generally improve the working mechanism in fuel feeding systems for power plants of the type disclosed in the copending patents of Frank C. Mock, heretofore noted.

The foregoing and other objects and advantages will become apparent in view of the following description taken in conjunction with the appended drawings, in which:

Figure 1 is a substantially central longitudinal sectional view of a jet propulsion power plant or engine incorporating a fuel feed and power control system in accordance with the present invention;

Figure 2, a simplified schematic view in elevation and partly in section of the fuel metering and power control unit indicated at 25 in Figure 1;

Figures 2A and 2B, enlarged sectional schematic views of the lower (regulator section) and upper (control or governor section) parts of Figure 2;

Figure 3, an enlarged plan or end view of the control lever mounting and coacting parts, the view being taken on the line 3—3, Figure 2;

Figure 3A, a view in side elevation of the control lever taken on the line 3A—3A, Figure 2;

Figure 4, a curve chart illustrating the operation of the system;

Figure 5, a curve chart for comparison with that of Figure 4 illustrating the differences in operation between the herein disclosed system and those of the prior art wherein power is controlled (1) by a direct manual connection with a fuel valve without barometric correction and (2) by resetting a governor operatively connected to a fuel valve, also without barometric correction; and Figure 6, an installation diagram.

Referring first to Figure 1, an aircraft engine nacelle is indicated at 10 and has supported therein as by means of ring 11 and brackets 12 a jet propulsion engine or power plant (sometimes termed "jet machine") generally indicated at 13 and including an outer casing 14, contoured at its front extremity to define an air inlet 15 and at its rear extremity to define a reaction tube 16. A dynamic compressor 17 (shown as a centrifugal blower but which may be of the axial flow type) forces air into an annular header 18 which directs it to a plurality of peripherally spaced cylinder-like generators or burner chambers 19 containing burners 20 having air inlet holes 20' in the peripheral walls thereof. The burners 20 discharge into a collector ring 21 arranged to deliver the hot air and products of combustion through a set of stationary directing blades 22 against the blades 23' of a turbine rotor 23. The turbine 23 and air compressor 17 are mounted on a common shaft 24 rotatably supported by a bearing 24'. Air entering the inlet 15 is picked up by the compressor, which acts to direct the air into chamber 18 and generator chamber 19, and thence into the burners 20 through holes 20', where heat is added by the combustion of fuel. The expanded air and products of combustion are directed against the blades 23' of the turbine 23 to drive the compressor and are then discharged to the atmosphere through the reaction tube 16 to effect propulsion of the plane. If desired, propulsion of the plane may also be accomplished by a propeller driven off of a forward extension of shaft 24, usually through suitable reduction gearing, not shown.

The fuel metering and power control device, or the housing therefor, is generally indicated at 25; for the purposes of illustration it is shown as installed in the annular chamber defined by the front extremity of the casing 14 in Figure 1 and which chamber is vented to atmospheric air or ram pressure by means of openings 26 and 26'. The device in the main comprises a regulator section 27 and a control or governor section 28 (see Figure 2). Fuel is supplied under pressure to the regulator by way of a conduit 29, 29' having mounted therein suitable fuel pressurizing means such as an engine driven fuel pump 30; the conduit 29' discharging into control inlet chamber 31, see Figure 2A. The pressure in chamber 31 is maintained at a predetermined value by means of a by-pass valve 32 which is preferably in the form of a hollow shell having inlet ports 33 at one end thereof, said valve being mounted to slide in a cage 34 removably secured in a housing 35 defining a chamber 36 which is ported to a conduit 37 leading back to the low pressure side of the pump 30. Valve 32 is connected to a stem bolt 38 which in turn is removably connected to a diaphragm 39 having its peripheral edge portion clamped between a cap 40 and a boss 40' projecting from the adjacent portion of the housing 25. Cap 40 is formed with a chamber 41 in which is mounted a spring 42 exerting a predetermined closing thrust on the by-pass valve 32. Chamber 41 is vented to the chamber 31 and to the fuel discharge side of the metering and control unit by means of ducts 43 and 43' having restrictions 44 and 45 therein for regulating flow through the balance pressure circuit provided by ducts or passages 43 and 43'. The effective area of the diaphragm 39 is preferably substantially the same as that of the valve 32, and hence the fuel supply pressure in chamber 32 will be maintained at a constant value above metered fuel or nozzle discharge pressure as determined by the strength of spring 42, or in other words, there will be a constant pressure drop across the regulator section 27 and governor control section 28. Preferably, the chamber 41 is vented to metered fuel pressure before the main fuel cut-off valve 130 (to be described) to prevent flooding of the engine during the cranking period preparatory to starting. Restriction 44 at the entrance to chamber 41 passes sufficient fuel to permit a continuous flow through said chamber and thus effect removal of any air or vapor bubbles that may collect therein, while restriction 45 at the exit from chamber 41 provides a damping action for the by-pass valve 32.

A maximum pressure relief valve 46 is carried by and slidably mounted in the valve 32 and is adapted to seat in and normally close a port 47 formed in the latter valve, the valve 32 being ported at 48 to the valve chamber 36. A spring 49 determines the pressure at which valve 46 will unseat. This valve 46 prevents build-up of excessive pressures due to shutting off the flow of fuel to the burners while the engine is running, and other causes.

The regulator 27 comprises a regulator valve 51 which is preferably in the form of a hollow cylinder having a plurality of metered discharge ports 52 at one end thereof, said valve being slidingly mounted in a cage 53, ported at 54 to a chamber 55 formed in housing 56, said chamber 55 being open to the chamber 31 for inflow of fuel from the latter chamber.

A metering head diaphragm is indicated at 60; it is clamped at its outer or peripheral edge between a casting 61 and an adjacent flange formed on the main housing or casting 25, and at its central portion between plates 62 and 63 provided with hub portions 62' and 63'. The hub 62' is constructed to releasably receive the disc shaped head of a hollow valve stem 64 having a flexible member such as a short length of cable projected therethrough and connected at its opposite ends, respectively, to the said stem 64 and the adjacent end of a stem bolt 64', the latter being connected to the valve 51. The cable provides a flexible connection between the valve 51 and diaphragm 60. The hub 63' of plate 63 is shaped to provide a cylindrical guide which is slidingly engaged in a bushing 65 inserted in a chamber 66 formed in the casting 61. A spring 67 is mounted in the chamber 66 and at its inner end bears against and is centered by the hub 62' of the diaphragm plate 62, said spring constituting a minimum metering head regulator in a manner to be described.

The diaphragm 60 constitutes a movable or flexible wall between a chamber C (which may be termed a "compensating fuel pressure chamber" for reasons which will subsequently become apparent) and unmetered fuel chamber D.

Referring now to Figure 2B, a fuel feed or governor valve is indicated at 70; it is substantially like the valve 51, being provided with a plurality of fuel ports 71 at one end thereof and slidingly mounted in a cage 72 ported to metered fuel chamber or conduit E at 73. The valve 70 is adjustably threaded on a stem member or rod 74 having a transverse bore mounting a spring pressed ball detent 75 adapted to engage in detent notches or recesses formed in a cylindrical flange 75' projecting axially from the valve. A bushing 76 is threaded into the housing 25 in axial alignment with the governor valve 70 and has adjustably threaded therein a minimum flow set screw 77 adapted to contact the adjacent end of the stem 74 and positively determine the closed position of valve 70. A spring pressed ball detent 78 locates the screw 77. The chamber defined by the bushing 76 is closed and sealed by a cap screw 79. Access may be had to valve 70 for adjustment purposes by removing bushing 76. At its right hand end, the valve 70 is engaged by a thrust spring 80 which bears against a guide bushing 81 mounted on the stem 74, the bushing 81 having sliding movement on an enlarged portion of the stem 74. A cylindrical supporting and bearing member 82, having a mounting flange 82', is secured to the adjacent main housing by screws 83.

A sliding sleeve or bushing 84 is mounted on the member 82 and is flanged at 84' for engagement with one end of a governor spring 85, the opposite end of said spring engaging a bushing 86 carried by a member 87 which is connected to the valve stem 74 by means of a short length of flexible cable 88. The member 87 has a freely rotatable bearing connection with the adjacent end of a rod 89 mounted to slide in a bearing sleeve or cylinder 90 supported for free rotation by a bracket 91 having a mounting flange 91' connected between an adjacent flanged portion of the main housing 25 and a governor housing 92. The free end of rod 89 is adapted to be engaged by the lever portions 93' of a pair of engine driven governor weights 93, only one of the latter being visible in Figure 2B.

A sleeve 94, formed with flanged portions 95 and 96, is mounted to slide on the bearing sleeve 90; and this sleeve 94 has an operative connection with the regulator valve 51 by means of a fork or yoke 97 and bell crank lever 98, the latter being fulcrumed or pivotally anchored at 99 and at its lower end being adjustably connected to the stem 64 of the said valve 51, see Figure 2A. The flange 96 of the sleeve 94 is adapted to be engaged by the lever portion 100' of each of a pair of engine driven speed metering weights 100 as the latter move outwardly due to centrifugal action, while the flange 95 of said sleeve is adapted to engage the yoke or fork 97 and turn lever 98 counterclockwise about its pivot 99, thereby producing a force proportional to the square of engine speed tending to open regulator valve 51.

In the schematic view of Figure 2B, one of the governor weights and one of the speed metering weights are shown arranged in what appears to be opposed relation or 180° apart. In the control as actually built, however, there is a pair of governor weights and a pair of speed metering weights pivotally mounted in opposed relation on a governor body or bracket 101 formed on the inner end of a stepped shaft 102 supported in a main bearing 103 and at its outer end splined to a stub shaft 102' provided with a drive spline 104 adapted to engage in the hub of a pinion or gear 105, see Figure 1, which is secured on an engine driven shaft 105'.

To ensure against leakage of fuel around the shaft 102, a seal assembly is provided and comprises an inner bushing 106 which encircles an annular packing groove formed in the shaft and is normally urged by the pressure of fuel plus the force of a spring 106' against the adjacent inner surface of a sealing and bearing ring 107. A retainer 108 is secured to the governor housing 92 and has a flanged portion engaging the opposite side of the ring 107, a packing ring 109 being compressed between the ring 107 and adjacent wall of the retainer.

Access may be had to the regulator valve assembly through an opening in the main housing or casting 25 provided with a cap or cover 110, see Figure 2A, carrying an adjustable stop 111 which positively limits movement of the regulator valve 51 in a valve opening direction.

A pilot's control lever 115 (Figures 2B, 3 and 3A) is provided and is operatively connected to the governor spring compressing sleeve 84 by means of a hollow link 116, a lever 117 secured on the one end of a shaft 118, and a yoke 119 secured on the opposite or lower end of said shaft and having fingers 119' engaging the flange 84' of sleeve 84. Shaft 118 is mounted for rotation in a pedestal bearing 118'. To provide a convenient idle speed adjustment, the lever 117 carries a pivot pin 120 which engages in an elongated slot formed in the hollow link 116, and an idle screw 121 is threaded into the outer end of the link 116 and is releasably held in its adjusted position by a spring detent 122, the inner end of said screw abutting the pin 120 and urging it and consequently the lever 117 counterlockwise against the thrust of a spring pressed sliding pin 122'. By adjusting idle screw 121, a predetermined idle spring force is applied to the governor spring 85 through lever 117, shaft 118 and yoke 119. Maximum speed adjustment is had by means of an adjustable eccentric 123 adapted to be engaged by a finger 124 secured on the shaft 118. The pilot's control lever 115 carries at one end thereof a pair of spring pressed detents 125 and 126 (Figure 3A) adapted to engage in recesses 125' and 126' (Figure 3) respectively, when the said lever 115 is moved to idle position and to minimum flow position, and releasably hold the lever 115 in either position.

The yoke 119 has an additional pair of inwardly projecting fingers 127 formed thereon which are adapted to engage the bushing 81 when the control lever 115 is turned clockwise beyond idle position and move governor valve 78 to a predetermined closed position, or to a position where it will pass a predetermined quantity of fuel in a manner and for a purpose to be described. To accommodate movement of the fingers 127, the cylindrical bearing member 82 is cut out or recessed as indicated at 128.

A fuel cut-off valve 130 is mounted in the conduit E; it consists of a hollow cylindrical valve member slidable in a cage or bushing 131 ported at 132 to discharge conduit 133. The valve 130 seats at 134 when the pilot's control lever 115 is turned clockwise beyond the locked poppet detent 126', said valve being internally threaded to receive a coarse pitch screw 135 secured on the inner end of a shaft 136 having a serrated collar or nut 137 secured on its outer end and for engagement with a serrated boss 137' formed on the lever 115, to permit angular adjustment or positioning of the latter lever simply by loosening end nut 138.

An override spring 139 is disposed in the hollow link 116 in abutting engagement with the pin 122' carried by lever 117. When the pilot's lever is turned to locked governor valve detent position, the resistance offered by the spring 139, which is greater than that of spring 80, causes the fingers 127 to engage sleeve 81 and compress spring 80 and move the governor valve to minimum flow position.

The conduit 133 leads to an annular manifold or fuel distributor ring 140, from which fuel is supplied to the individual burner nozzle 141 by way of fuel lines 142, see Figure 2.

To compensate or correct the metering differential for changes in air density, an aneroid assembly 145 is provided and includes a spring loaded bellows or capsule 146 which is anchored at one end to a bushing 147 carried by an outer case or housing, and at its opposite or movable end is connected to a cup-shaped member 148 secured to a connecting and guide rod 149 encircled by a loading spring 150 acting counter to another loading spring 150' within the bellows. By using a pair of coacting springs, as shown, sensitivity of the aneroid is improved. The bellows 146 may be loaded for response to change in both pressure and temperature (see Patent No. 2,376,711 to F. C. Mock) and is preferably located where it will be subjected to ram or compressor inlet pressure. The rod 149 is pivotally connected to the one end of a lever 151, the opposite end of said lever being secured on the outer end of a shaft 152, journaled in a sealed bearing sleeve 153 supported by a housing 154 forming part of the casting 61. The outer or left-hand end of shaft 152 is shouldered and engages a thrust bearing 153'. The inner end of shaft 152 projects into a chamber 155 and has secured thereon a lever 156 which is pivotally and adjustably connected by means of a screw 157' to the one end of a needle valve 157 mounted for sliding movement in a bushing 158 and contoured at its opposite end to regulate flow of fuel through a port 159. A passage 160 communicates unmetered fuel chamber D with compensating fuel chamber C and has therein a calibrated jet 161; and fuel may flow from chamber C to metered fuel chamber or conduit E by way of passage 162, port 159 and passage 163. To ensure free movement of needle 157, fuel may flow through annular passage 164 to a chamber 165 formed in a bushing 166 surrounding the lower or outer extremity of said needle and thence to chamber 155 between the end of the needle and a jam nut 167. The needle body is also grooved as at 168 to facilitate lubrication and prevent binding from sediment and reduce friction. The particular method of mounting the shaft 152 as shown provides an effective seal against leakage of fuel from chamber 155 outwardly past the said shaft and its bearing sleeve 153 and at the same time reduces the resistance to torque to a minimum. The shaft may have a bearing fit in sleeve 153 of, for example, .0002" or less, while the sleeve itself is formed with a pair of grooved enlargements at its opposite ends, providing in effect a floating mounting for said sleeve. Between the enlarged ends of the sleeve is an annular space or chamber 169', which is vented to the inner bearing surface of the sleeve and is adapted to receive a suitable lubricant upon removal of cap 169''. The floating mounting permits the use of different metals in the sleeve and housing, for example steel and aluminum, having different coefficients of expansion, without danger of binding the shaft 152. The air density compensating mechanism per se is being claimed in my copending application Serial No. 417,043, filed March 18, 1954, which application was divided out of this, the parent application.

*Operation*

No starting mechanism has been shown since any suitable type of such apparatus may be used. Conventional starting systems usually employ an electrical starting motor, controllable from a remote point as from the pilot's compartment, for turning the engine during the starting period and an ignition circuit including a spark plug or pilot light located at one or more of the burners for igniting the fuel issuing from the burner nozzles. Figure 6 illustrates diagrammatically a fuel system for a jet engine incorporating the herein disclosed control and adapted for aircraft. The boost pump is usually controlled from the pilot's compartment and cooperates with the engine driven pump to provide the required fuel pressure during the starting period. The cockpit fuel shut-off valve is for safety purposes and is independent of the fuel control unit. An emergency or auxiliary fuel supply system may be required as a safety factor for restarting and maintaining operation during flight in the event of failure of the main fuel pump 30 or some vital part of the control unit itself. Such an emergency system may utilize a conduit 170 arranged to by-pass fuel around the main fuel control unit to the nozzles 141 and having therein an auxiliary fuel pump 171 which in turn is by-passed by a conduit 172 controlled by valve 173. This auxiliary pump 171 may be independently driven and manually controlled from the cockpit. The valve 173 is also preferably controlled from the pilot's compartment by an auxiliary throttle lever; and as long as valve 173 is open, the auxiliary pump 171 idles, but when it is closed, the pump builds up pressure in conduit 170 and consequently nozzle or discharge pressure. The two check valves 174 and 175 prevent back pressure or flow in the main system when the auxiliary system is operating, and vice versa.

Before making the initial start, all fuel lines and the control unit should be bled to remove any entrained air that may be present. A convenient method is to turn the power control lever 115 to cut-off position, that is, it should be turned clockwise until the valve 130 seats at 134, Figure 2B. This is back of the point where the detent 126 engages in the detent recess 126'. The fuel line 133 may then be disconnected from the manifold ring 140 and directed into a container. The boost pump should then be turned on and the valve 130 opened until about a gallon of fuel is discharged into the container. The control unit itself is provided with suitable vents which may be opened to ensure removal of air during the bleeding process.

Starting may be accomplished either through the auxiliary system, or through the main system by means of the power control unit.

An example of starting on the auxiliary system is as follows: Lever 115 is turned to cut-off position, the cockpit fuel shut-off valve opened, and the auxiliary control valve 173 closed to prevent the boost pump from prematurely filling the fuel manifold ring 140. The boost pump is then turned on and the starter motor engaged with the engine until the latter is turning at approximately 1000 R. P. M., whereupon the auxiliary pump 171 is turned on. The starting motor may be kept engaged after firing until the engine reaches a speed of approximately 2000 R. P. M. When the burners ignite, the auxiliary valve 173 is turned to approximately one-fourth power position, or opened sufficiently to cause the tail pipe or burner temperature to immediately fall below 800° C. When the temperature reaches approximately 800° C., the power setting of the auxiliary valve 173 is gradually increased by closing the latter until the speed of the engine is in the neighborhood of 5000 R. P. M.; whereupon the main power lever 115 is moved to idle position, the auxiliary throttle or control valve 173 opened and the auxiliary fuel pump 171 turned off. Thereafter the engine may be controlled by the lever 115.

An example of starting by means of the control unit 25 is as follows: The auxiliary valve 173 is closed to prevent fuel flow through the auxiliary fuel system (the pump 171 at this time being out of operation), the lever 115 turned to cut-off position, the boost pump turned on, the starter switch engaged and the lever 115 turned to idle position for approximately two seconds and then turned back to cut-off until the starter is turning the engine at about 1000 R. P. M., whereupon the lever 115 is again turned to idle until the burners ignite, then turned back to the locked poppet or governor valve detent position between idle and cut-off and held there until the tail pipe or burner temperature falls below some predetermined safe value, for example, 800° C. (The starter may be kept engaged after firing until the engine attains a speed of approximately 2000 R. P. M.) The lever 115 is then advanced to the idle speed setting (which at ground level may be approximately 4000 R. P. M. maximum) at a rate gradual enough to maintain safe operating temperatures in the burner system until the engine is warmed up.

In the position of the power control lever in Figures 2B and 3, the said lever is in a medium power position, the governor spring being only partly compressed and being balanced by the governor weights 93 acting through the rod 89 to maintain the governor valve 70 in equilibrium for the particular setting of the lever 115. If the lever 115 is turned clockwise from the position shown to a point where the detent plunger 125 engages in the notch 125', the yoke 119 and the fingers 119' carried thereby will swing to the left and further relieve the tension on the governor spring 85 until the governor weights 93 balance the governor valve 70 at the idle speed setting. If the lever 115 is turned further in a clockwise direction to a point where the detent plunger 126 engages in the notch 126', the fingers 127 carried by the yoke fingers 119' engage the sliding bushing 81 and compress the spring 80, thereby holding the governor valve open sufficiently to pass a predetermined amount of fuel for starting purposes. At this time the cut-off valve 130 is still open. This so-called "locked poppet or governor valve detent position" gives the pilot a sense of feel as to the proper position of the lever 115 during the starting period so that there will not be an excessive fuel build-up in the system which when the throttle lever 115 is advanced to increase the engine speed would result in high burner temperatures due to a sudden oversupply of fuel to the burners.

Above idle speed, the throttle can be advanced at any desired rate, since the control unit will maintain safe operating temperatures at all times.

When the governor valve is in "locked poppet" position, the engine driven governor weights have no controlling action thereon.

The closed cut-off position of the lever 115 is sensed by the pilot when he begins to compress the override spring 139 in the link 116. When the lever 115 is turned to cut-off position, the spring 80 is compressed to a point where the governor valve may be against stop 77, whereupon the cut-off valve 130 seats at 134, and flow of fuel through the burners is completely stopped. The cut-off position is generally used only when the engine is shut down.

The resilient idle speed setting as determined by adjustment of the idle screw 121 permits the pilot to release his quadrant when idling if he so desires, assuming the friction resistance of the quadrant is less than the force of governor spring 85. The idle setting should, of course, be above that determined by the stop 77.

In tracing the flow of fuel through the control unit it may be assumed that the system is empty at ground level, in which event the differential across diaphragm 60 would be zero and the regulator valve 51 would be open under the influence of the spring 67. If the throttle valve 70 is at idle or some partly open position and the engine is cranked, fuel will flow through conduit 29' into chamber 31, then across valve 51 to chamber D, from which it flows across valve 70 to chamber or conduit E and thence through conduit 133 to manifold ring 140 and fuel lines 142 to the discharge nozzles 141. Fuel would also flow through the passage 160 to chamber C of the regulator and thence through passage 163 to chamber or conduit E in a manner and for a purpose to be described.

Since the shaft 102 which carries the speed metering weights 100 is driven in relation to engine or turbine speed, the speed metering weights 100 will exert a force tending to open regulator valve 51 proportional to the square of engine speed. As this valve opens, however, pressure builds up in chamber D and acts on the diaphragm 60 in a direction tending to close the valve. The minimum metering head spring 67 has little effect on the differential across diaphragm 60 at fuel flows above idle; its purpose is primarily to predetermine the minimum value of metering head across the governor valve 70 at speeds which may be so low as to result in instability of the control. The pressure differential across diaphragm 60 is imposed across the feed restriction 73, and since this differential is substantially proportional to the square of engine speed, for any given position of the governor valve 70 and the density needle 157, the velocity and hence the weight of fuel flow through the said restriction 73 will be proportional to the square root of this differential or to the speed directly, so that fuel feed is in direct relation to engine speed. Movement of the governor valve 70 in a direction to increase the area of the feed restriction 73 decreases the differential across the diaphragm 60, whereupon the regulator valve 51 moves towards open position, feed of fuel to the burners is increased and the engine or turbine speeds up until the governor weights 93 balance the setting of the governor spring 85 and an equilibrium condition is obtained. Movement of the governor valve 70 in a direction to restrict the feed orifice 73 increases the differential across the diaphragm 60, whereupon the regulator valve 51 moves towards closed position, feed of fuel to the burners is decreased and turbine or engine speed is reduced until a condition of equilibrium is obtained.

During acceleration and deceleration, the metering head or differential and hence the rate of fuel feed will increase and decrease as a function of engine speed as will also the quantity of air delivered to the burners.

By using a governor valve with a plurality of openings such as indicated at 71, or a graduated discharge opening, any tendency toward instability due to a Venturi or suction action when the valve approaches an equilibrium position is materially reduced in contradistinction to valves having an ungraduated port or ports which interpose little or no resistance to fuel flow in varying the area of the restriction 73. The openings 71 constitute in effect part of the feed orifice or restriction in conjunction with the feed restriction 73. The openings 52 in the regulator valve 51 function in the same manner as do the openings 71 in the valve 70.

The curve chart of Figure 4 illustrates the acceleration and deceleration characteristics of the improved fuel control unit herein disclosed. In this figure, curve $a$ represents the fuel feed required for steady speed, that is, the rate at which fuel would be fed to bring the engine to a maximum or some predetermined speed at a given air density. The dotted line $b$ represents the maximum delivery of the fuel pump 30. The by-pass diaphragm 39 is vented before the cut-off valve 130 in order that the main fuel pump 30 can build up sufficient pressure for starting, while the maximum pressure relief valve 46 prevents build-up of pressures beyond a safe value. The dot and dash lines of Figure 4 represent the fuel flow vs. speed characteristic of the control for various settings of the governor valve 70, each line having indicated thereon the approximate air-fuel ratio which would result, for example, at ground level density, and those of the richer mixtures also having the approximate temperatures produced by the ratio of fuel-to-air. Let it be assumed that the engine is operating at speed $c$ and the pilot opens governor valve 70 to a point which will produce speed $d$ (which may bring the arm 124 against the high speed eccentric 123); then the fuel supply during this period of acceleration will follow the arrows $e$ from $c$ to $d$. The initial increase in flow represented by the vertical arrows occurs as a result of the increase in effective area of the feed restriction 73 at the then existing speed. As the speed increases, the fuel flow will increase in straight line relation with the speed until equilibrium operation is obtained at $d$. During this period of acceleration, the fuel flow does not attain such magnitude as to produce harmful burner temperatures. If now the pilot returns his power control lever to its original setting (which may bring the valve stem 74 back against the low speed stop 77), the fuel flow will follow the arrows $f$ from $d$ back to $c$. During this deceleration period, the fuel flow is maintained sufficiently high to prevent burner failure or dieout.

Upon a decrease in the density of air flowing to the engine, less fuel is required to drive the turbine and compressor at a given speed, and unless the maximum rate of fuel delivered to the engine on acceleration is correspondingly reduced, much higher burner temperatures will be experienced during acceleration at altitude than at sea level under similar engine conditions, due to the extremely rich fuel-air ratio. For an engine of the type herein described, the fuel rate required to maintain a given speed varies approximately directly with the entering air density. If a pilot or operator were to carefully "nurse" the power control lever during acceleration and adjust the feed valve in a manner such that the rate of fuel feed increases in direct relation to engine speed, compensation for changes in density by regulating the differential across the governor valve would not be necessary, but the control would then be so sensitive to slight changes as to be impractical; and this also holds true during deceleration. Again, in jet propulsion machines for aircraft, it may be desirable to have a relatively high idling speed to insure against engine failure when in the air, and this correspondingly reduces the range of governor valve movement and increases sensitivity between low and high power settings. It is of considerable advantage for a pilot to be able to move the governor valve between its low speed position against stop 77 and its high speed position with the arm 124 against the eccentric 123 without any fear or worry as to damage to the burner system or "dieout" of the engine at all altitudes.

The density control circuit is shown in Figures 2A and 2B; it comprises the passage 160, jet 161, passage 162, variable restriction or port 159 controlled by needle valve 157, and passage 163 opening into metered fuel chamber or conduit E. A decrease in entering air density causes elongation of the bellows 146 and an increase in the area of the orifice 159, while an increase in density has the opposite effect. For a given engine or turbine speed, the differential across the metering head diaphragm 60 will be constant, and hence the flow through the control jet 161 will remain constant. All flow of fuel through the jet 161 will pass through the orifice 159, and hence the drop across the latter orifice will vary as the square of its area, and for a fixed or given position of the needle 157 (constant density), the drop across the orifice 159 will be proportional to the drop across the jet 161. The sum of the drop across the orifice 159 and the drop across the diaphragm 60 (or jet 161) is substantially equal to the drop across the governor valve 70, and at a given density, the total drop will be proportional to the square of engine speed. If the effective area of orifice 159 is enlarged, there will be a corresponding decrease in the drop across this orifice and a reduction in head across governor valve 70 or feed restriction 73, resulting in a diminished flow of fuel to the burners for a given area of feed restriction 70. Thus, if the governor valve 70 is opened for acceleration at certain altitude, less fuel will be supplied to the burners than would be the case at ground level or at some lower altitude. By suitably contouring the needle 157, substantially complete density compensation may be obtained, and this advantage is not only present in acceleration and deceleration, but it also will maintain a given engine or turbine speed at all altitudes for any fixed or given position of the power control lever 115.

Figure 5 illustrates how the curve a (fuel required for steady speed) is lowered at high altitudes, for example, 45,000 feet. Without density compensation, the danger of overheating as a result of increased fuel feed without correlation of engine speed and power lever position becomes greater. This figure also includes arrow curves representing acceleration by prior art governor controls alone as well as by direct connection between a throttle lever and a metering valve with or without a governor for maintaining equilibrium at a given fuel rate selection. The dotted arrow lines at e' indicate how when a speed governor controlling the fuel valve is reset to accelerate from c to d, the full capacity of fuel pump is delivered to the engine and fuel will be supplied greatly out of proportion to the air being pumped, thereby producing intense heat in the burner system. The dotted arrow line e'' indicates the rate of fuel feed during acceleration with a direct connected lever. In this instance, the ratio of fuel-to-air is not so out of proportion as with a governor control alone, but is still such as to produce intense heat in the burner system, particularly during the initial portion of the period of acceleration. In both types of prior control systems above noted, the deceleration curve drops well below the normal fuel rate for steady speed with resulting danger of burner failure.

It is important that a control unit of the type with which the present invention is concerned be compact, relatively light in weight and yet rugged in design. The control unit as herein disclosed has the foregoing advantages, due in part to the arrangement of the governor weights 83 and the speed metering weights 109 on a common shaft and the manner in which they are connected to the parts controlled thereby, viz. the governor valve 70 and the regulator valve 51; the mounting of the relief valve 46 within the by-pass valve 32; and the arrangement of the control lever and coacting parts for the governor valve which also tend to reduce the strain on and ease the work of a pilot.

No attempt has been made herein to set forth all the advantages and applications of the improved control unit, it being understood that important advantages other than those enumerated are present and also that modification and rearrangement of parts may be made within the scope of the invention as defined by the appending claims.

I claim:

1. In a fuel feeding system for an engine, means defining a flow passage for supplying fuel under pressure to the engine, a variable feed or metering restriction in said passage, a selectively operable governor valve for varying the area of said feed restriction, a valve in said passage for regulating the metering head across said feed restriction, a governor shaft adapted to be driven in relation to engine speed, a centrifugal governor rotatable with said shaft and operatively connected to said governor valve, and means for controlling said regulating valve as a function of engine speed, said regulator valve being movable in a direction to increase the metering head with an increase in engine speed, and said controlling means including a mechanical connection between said governor and the regulating valve and a diaphragm operatively connected to said regulating valve and arranged to respond to the differential across said feed restriction.

2. In a fuel feeding system for an engine, means defining a flow passage for supplying fuel under pressure to the engine, a variable feed or metering restriction in said passage, a selectively operable governor valve for varying the area of said feed restriction, a regulator valve in said passage for regulating the metering head across said feed restriction in such a manner that an increase in engine speed results in an increase in the metering head, a shaft adapted to be driven in relation to engine speed, and a centrifugal governor rotatable with said shaft including a governor weight having an operative connection with the governor valve and another weight movable independently of said first-named weight and having an operative connection with said regulator valve.

3. In a fuel feeding system for an engine, means defining a flow passage for supplying fuel under pressure to the engine, a variable feed or metering restriction in said passage, a manually controllable governor valve for varying the area of said feed restriction, a regulator valve in said passage for regulating the metering head across said feed restriction as a function of engine speed, a diaphragm operatively connected to said regulator valve and arranged to respond to the differential across said governor valve, a shaft adapted to be driven in relation to engine speed, a centrifugal governor rotatably mounted on said shaft and including a plurality of governor weights, at least one of said governor weights having a mechanical operating connection with said governor valve and at least one of the remaining weights being independently movable and having a mechanical connection with said regulator valve, said latter weight and said diaphragm being operable to position said regulator valve so that an increase in engine speed results in an increase in the metering head.

4. In a device for metering fuel to an engine as a function of engine speed, a housing or casing defining a flow passage for fuel to be supplied to the engine, a shaft journaled in said casing adapted to be driven by the engine, a variable feed or metering restriction in said passage, a governor valve for varying the area of said feed restriction, a centrifugal governor mounted on said shaft and including a governor weight operatively connected to said valve, a governor spring for tensioning said weight, a manually controllable power lever for adjusting said governor weight and valve through said spring, and a regulating valve for controlling the feed differential across said governor valve as a function of engine speed, said centrifugal governor including a metering weight movable independently of said first-named weight and operatively connected to said regulating valve, and said regulator valve being movable to increase the feed differential with an increase in engine speed.

5. In a fuel supply system for engines, a housing or casing defining a fuel flow conduit, a variable feed or metering restriction in said conduit, a governor valve for varying the area of said restriction, a governor rotatable in relation to engine speed operatively connected to said valve, a governor spring, a member movable to variably tension said spring, a power control lever, and linkage mechanism operatively connecting said power control lever with said member including a hollow slotted link to which said member is pivoted, a spring housed in said link and engaging said pivot, and means for adjusting the position of said pivot against the resistance of said latter spring.

6. In a fuel feeding system for engines, a fuel conduit having a variable feed or metering restriction therein, a governor valve for varying the area of said restriction, a governor operatively connected to said valve, a governor spring, a power control lever, means operatively connecting said lever with said spring including a member movable to compress and release said spring, and resiliently mounted means connected to the governor valve and adapted to be engaged by said member when the power control lever is turned to a predetermined low power position and move the governor valve to a predetermined low fuel flow setting.

7. A system as claimed in claim 6 wherein means are provided for releasably maintaining said lever in said low power position.

8. In a fuel supply system for engines, a housing or casing defining a fuel flow conduit having a variable feed or metering restriction therein, a governor valve for varying the area of said restriction, a governor rotatable in relation to engine speed operatively connected to said valve, a governor spring, a power control lever, means connected to said lever for variably tensioning said governor spring including an adjustable pivot adapted to predetermine the idle position of said governor valve, a spring movable with said governor valve and adapted to be compressed when the power control lever is turned a predetermined distance in a valve closing position, and another spring opposing said idle pivot of greater strength than said second-named spring.

9. In a fuel supply system for engines, a housing or casing defining a fuel flow conduit having a variable feed or metering restriction therein, a governor valve for varying the area of said restriction, a governor rotatable in relation to engine speed operatively connected to said valve, a governor spring, a power control lever, a member connected to said lever for variably tensioning said governor spring, linkage mechanism interposed between said power control lever and member including an adjustable resilient stop adapted to predetermine the idle position of said governor valve, and a resiliently mounted member movable with said governor valve and adapted to be engaged by said first named member when the power control lever is turned a predetermined distance in a valve closing position beyond said resilient idle stop.

10. In a fuel feeding system for engines, a fuel conduit having a variable feed or metering restriction therein, a governor valve for varying the area of said restriction, a governor operatively connected to said valve, a governor spring, a fuel shut-off valve in said conduit downstream of said governor valve, a power control lever, means operatively connecting said lever with said governor spring and said shut-off valve, said connecting means including an override spring adapted to be compressed when the power control lever is turned to a predetermined low power position while at the same time permitting further rotation of said lever to fully close the shut-off valve.

11. In a fuel feeding system for an engine, means defining a flow passage for supplying fuel under pressure to the engine, a variable feed or metering restriction in said passage, a selectively operable governor valve for varying the area of said feed restriction, a valve in said passage for regulating the metering head across said feed restriction, means for controlling said regulating valve as a function of engine speed in such a manner that the metering head varies in the same sense as engine speed, a density control circuit including a passage by-passing the governor valve and having a fixed restriction and a variable restriction in series therein, and means for varying the area of the variable restriction.

12. In a fuel feed and control device for an engine, a fuel conduit having metering means therein including a variable feed or metering restriction, a valve for varying the area of said restriction and a regulator valve for maintaining a metering head across said restriction, a pump for supplying fuel under pressure to said regulator valve, a by-pass valve for maintaining a predetermined pressure drop across the metering means, a diaphragm connected to said by-pass valve, and means venting that portion of said conduit between said supply pump and said regulator valve to a low pressure source across said diaphragm.

13. In a fuel feed and control device for an engine, a fuel conduit having metering means therein including a variable feed or metering restriction, a valve for varying the area of said restriction and a regulator valve for maintaining a metering head across said restriction, a pump for supplying fuel under pressure to said regulator valve, a by-pass valve for maintaining a predetermined pressure drop across the metering means, a pressure responsive element connected to said by-pass valve, said pressure responsive element being subjected on one side thereof to supply pressure and on its opposite side being vented to metered fuel pressure, said vent to metered fuel pressure having a restriction of predetermined flow capacity therein to effect a damping action on said by-pass valve.

14. In a fuel feeding system for engines, a fuel conduit having a variable feed or metering restriction therein, a governor valve for varying the area of said restriction, a governor operatively connected to said valve, a governor spring, a power control lever, means operatively connecting said lever with said spring including a member movable to compress and release said spring, and means for releasably holding said power control lever in a predetermined idle position and a predetermined starting position below idle comprising a pair of spring pressed detent members located in predetermined relation with respect to said lever.

15. In a fuel feed system for an engine, means defining a flow passage for supplying fuel under pressure to the engine, a variable feed or metering restriction in said passage, a selectively operable governor valve for varying the area of said feed restriction to select an operating speed for the engine, a valve in said passage for regulating the metering head across said feed restriction, means for controlling said regulating valve as a function of engine speed in such a manner that the metering head varies in the same sense as engine speed, another fuel flow passage branching off from said first-named flow passage downstream of the regulator valve and by-passing said restriction, a variable restriction in said branch passage, and means for varying the effective area of said latter restriction at any given position of said governor valve.

References Cited in the file of this patent

UNITED STATES PATENTS

| Number | Name | Date |
|---|---|---|
| 377,168 | McMahon | June 31, 1888 |
| 421,931 | Hart | Feb. 25, 1890 |
| 1,567,101 | Bailey | Dec. 29, 1925 |
| 1,751,457 | Heywood | Mar. 18, 1930 |
| 1,998,223 | Czarnecki | Apr. 16, 1935 |
| 2,095,991 | Lysholm | Oct. 19, 1937 |
| 2,259,693 | Hogeman | Oct. 21, 1941 |
| 2,303,295 | Allen | Nov. 24, 1942 |
| 2,380,963 | Greenman | Aug. 7, 1945 |
| 2,405,888 | Holley | Aug. 13, 1946 |
| 2,407,115 | Udale | Sept. 3, 1946 |
| 2,472,050 | Staples | May 31, 1949 |

FOREIGN PATENTS

| Number | Country | Date |
|---|---|---|
| 478,701 | Germany | July 1, 1929 |
| 560,196 | Great Britain | Mar. 24, 1944 |